United States Patent [19]

Fournier et al.

[11] Patent Number: 4,570,981
[45] Date of Patent: Feb. 18, 1986

[54] ADAPTER SEAL

[75] Inventors: Paul J. E. Fournier, Jackson; Joseph F. Reinker, Jr., Parma, both of Mich.

[73] Assignee: Aeroquip Corporation, Jackson, Mich.

[21] Appl. No.: 656,273

[22] Filed: Oct. 1, 1984

[51] Int. Cl.[4] .............................................. F16L 19/00
[52] U.S. Cl. ................... 285/332.3; 285/334.1; 285/354; 285/DIG. 11
[58] Field of Search .................. 285/334.1, 379, 332.3, 285/334.5, DIG. 11, 354, 334.3, 332.2

[56] References Cited

U.S. PATENT DOCUMENTS

| 323,731 | 8/1885 | Phillips | 285/DIG. 11 X |
|---|---|---|---|
| 830,392 | 9/1906 | Wiedeman | 285/DIG. 11 X |
| 923,112 | 5/1909 | Brodie | 285/379 |
| 1,133,320 | 3/1915 | Rockwood | 285/332.3 |
| 1,293,163 | 2/1919 | Mitchell et al. | |
| 1,649,673 | 11/1927 | Dyck | |
| 2,635,900 | 4/1953 | Mayo et al. | 285/332.3 |
| 2,775,471 | 12/1956 | Douglass | 285/332 |
| 2,871,036 | 1/1959 | Goodman | 285/379 X |
| 3,139,294 | 6/1964 | Richards, Jr. | 285/379 X |
| 3,233,921 | 2/1966 | Holmgren | 285/110 |
| 3,249,372 | 3/1966 | Pollack | 285/332.3 |
| 3,262,722 | 7/1966 | Gastineau et al. | 285/379 X |
| 4,458,926 | 7/1984 | Williamson | 285/332.3 |

Primary Examiner—Thomas F. Callaghan
Attorney, Agent, or Firm—Beaman & Beaman

[57] ABSTRACT

A seal for use with a conventional conical nose conduit fitting interposed between the conduit fitting parts wherein the seal includes a conical metal portion compressed between the coupling parts establishing metal-to-metal engagement, and the seal also includes an inner end to which an elastomer is bonded, the elastomer being compressed between the fitting surfaces to additionally provide elastomeric sealing.

2 Claims, 4 Drawing Figures

ADAPTER SEAL

BACKGROUND OF THE INVENTION

A common conduit fitting utilizes a male adapter having a conical nose which engages a flared or conical surface defined upon a conduit, or fitting component associated with the conduit, wherein the conical surfaces of the fitting parts engage in metal-to-metal relationship. A nut, or similar axial force producing device, is used to produce engagement of the conical fitting surfaces.

Unless the conical fitting surfaces are substantially concentric and accurately formed free of scratches and dents, leakage may result even though the nut is fully tightened. Also metal "creep" and cold flow over a duration of time may result in dimensional changes permitting leakage, and in the past, problems have been encountered in fluid systems using conical adapter coupling components permitting leakage, and where such fittings are not located as to be readily observable, the failure of the fitting can produce serious problems, and render the associated fluid conduit inoperable.

The dependability of fittings utilizing conical nose surfaces, such as of the 37° or 45° type, can be improved by utilizing a metal seal intermediate the axially aligned conical surfaces of the fitting parts. The engagement of the fitting conical surfaces with a metal seal permits the seal to deform, if necessary, to accommodate itself to machining inaccuracies and nonconcentric relationships, but such a metal seal is still subject to cold flow displacement over extended durations, and may leak if the nose is scratched or dented. In systems wherein long life dependability is important, metal seals have been utilized between the conical surfaces of fittings, particularly in refrigeration circuits, but cold flow problems have not achieved the absolute 100% dependability desired.

It is an object of the invention to provide a seal for use with conduit fittings employing axially aligned conical surfaces wherein the seal permits metal-to-metal engagement, and additionally, provides elastomeric sealing to maintain the integrity of the seal even in the presence of metal flow.

An additional object of the invention is to provide a seal for use with conical face fittings wherein the seal utilizes both metal-to-metal and elastomeric sealing characteristics, and the seal is economical to manufacture and readily installable.

In the practice of the invention, the seal used with the fitting is mounted upon the male adapter adjacent the conical nose surface thereof, and the seal is of an annular configuration formed of steel, aluminum, brass, etc. The seal body includes a cylindrical portion received upon a cylindrical adapter surface, and a cone depending therefrom which overlies a portion of the adapter conical surface.

The inner end of the seal cone has an elastomeric tip or ring bonded thereto, and the radial dimension of the cone is such that both the metal and elastomeric sections thereof will be located between the conical surfaces of both halves or portions of the assembled fitting. Thus, both the metal and elastomer portions of the seal will be under compression upon the fitting being fully assembled.

The metal conical portion of the seal permits metal-to-metal sealing, while the elastomeric portion provides the efficient sealing characteristics of an elastomer seal. The seal accommodates itself to surface irregularities present in the fitting conical surfaces, and dimensional changes that may occur due to metal flow will be accommodated by the self-expanding characteristics of the elastomer to maintain the integrity of the fitting over long durations.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
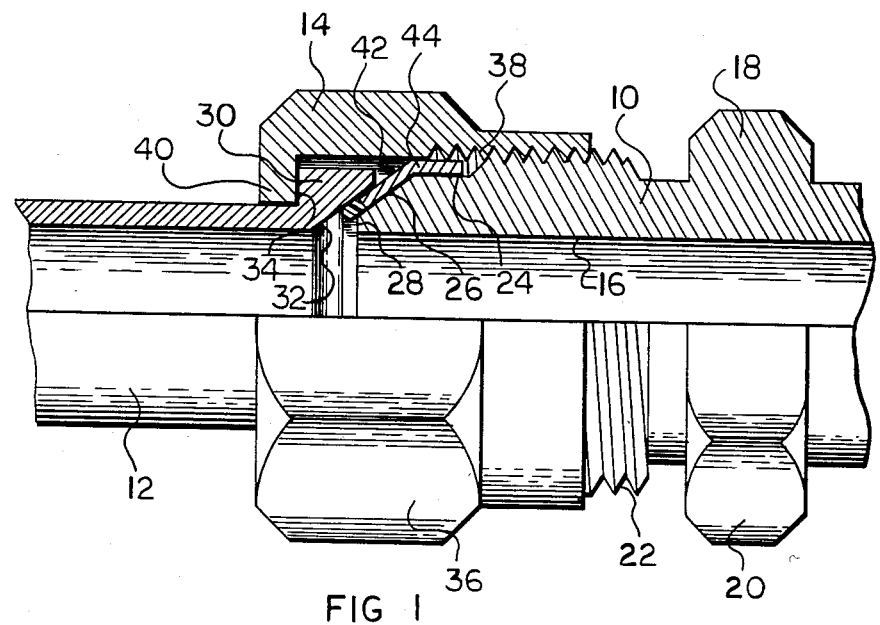
FIG. 1 is an elevational view of a fitting utilizing the seal of the invention, the upper half thereof being shown in diametrical section, and the fitting being fully assembled.
Figure 2:
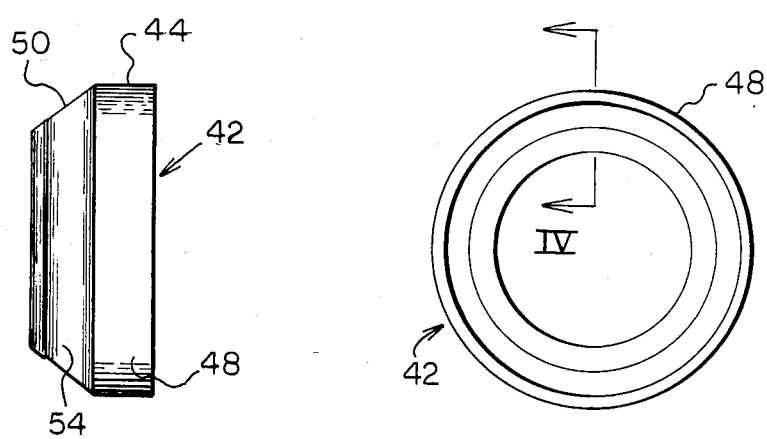
FIG. 2 is an elevational view of the seal, per se.
Figure 3:
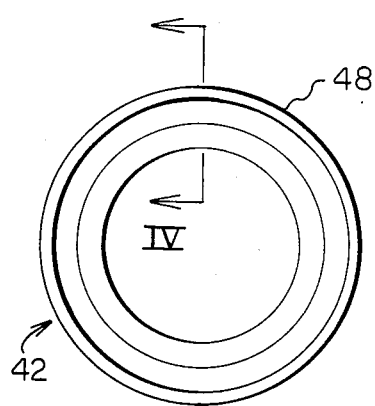
FIG. 3 is an end elevational view of the seal as taken from the left of FIG. 2.

With reference to FIG. 1, a conventional fluid conduit fitting is illustrated consisting of the male adapter part 10, the conduit, or conduit associated part 12, and a compression nut 14. The adapter fitting part 10 comprises a metal body affixed at its right end to a conduit, hose, tank, reservoir or the like not shown, and the adapter includes an axial bore 16, a wrench engaging portion 18 having wrench flats 20 defined thereon, and external threads 22 for cooperation with the compression nut 14.

The adapter includes a cylindrical surface 24 adjacent to and intersecting the conical nose 26, and the conical nose is preferably of the conventional 37° configuration and intersects the radial adapter end surface 28. The adapter is conventional in all respects.

The other primary part of the fitting includes the conduit 12 which may be attached to the hose or rigid conduit, or may comprise a metal conduit, itself. The end of the part 12 is provided with an enlarged head 30 defining a conical surface 32 which is of such radial positioning as to be in axial alignment with the adapter conical surface 26 when the fitting parts are axially aligned. The head 30, in some installations, may consist of the well known flared end of a conduit, and the head includes a radial surface 34 engagable by the compression nut 14.

The compression nut 14 includes wrench flats 36 and internal threads 38 for cooperation with the adapter threads 22, and an inwardly extending flange 40 is axially aligned with the head surface 34 for engagement therewith for imposing an axial force upon the fitting part 12.

The seal 42 in accord with the invention is of an annular form and primarily formed of metal, such as brass, aluminum, steel, etc. and includes a cylindrical portion 44 having an inner surface 46 only slightly larger than the adapter surface 24 for engagement therewith, and the outer surface 48 of the seal comprises the maximum circumference thereof.

The cone portion 50 of the seal depends from portion 44 and comprises substantially parallel inner side 52 and outer side 54 defining a conical portion oriented at approximately 37° to the cylindrical portion 44. The thickness of the cone 50 is defined by the sides 52 and 54, and the thickness of the cone is substantially the same as that of the cylindrical portion 44.

Figure 4:
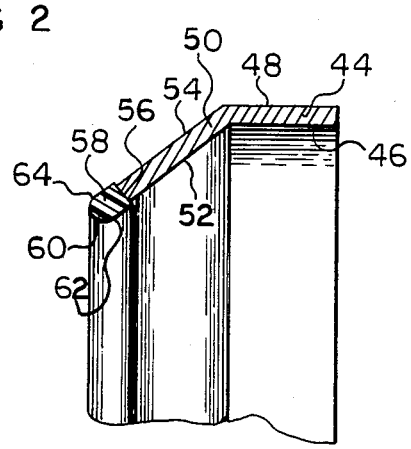
FIG. 4 is an enlarged, elevational, sectional view as taken along Section IV—IV of FIG. 3.

The outer end 56 of the cone 50 has an annular elastomeric ring 58 bonded thereto, and the elastomeric ring seal includes an inner end, FIG. 4, bonded to the cone 56, and an outer end 60 which may be of a radiused configuration. The elastomeric ring includes an inner surface 62 and outer surface 64 which are spaced apart a distance at least equal to the spacing of the cone surfaces 52 and 54, and preferably, the spacing between the elastomer sides 62 and 64 is slightly greater than that of the cone sides.

Bonding of the elastomer seal 58 to the cone 50 may be augmented by forming irregularities, holes, or the like in the outer end of the metal of the cone, and as will be appreciated from FIG. 1, the radial dimension of the cone 50 is such that the elastomer 58 will be axially aligned between the fitting surfaces 26 and 32 when the seal is assembled to the fitting parts as shown in FIG. 1.

In use, the seal 58 is located upon the adapter 10 as appreciated in FIG. 1, i.e. the seal inner cylindrical surface 46 being placed upon the adapter surface 24, and the cone surface 52 engages the adapter surface 26. The fitting part 12 is coaxially aligned with the adapter 10, and the nut 14 is threaded upon the adapter thread 22. The nut is tightened drawing the surfaces 26 and 32 toward each other compressing the cone 50 therebetween to produce an effective sealing relationship.

The compression produced on the cone 50 compresses the elastomer 58, and accordingly, an effective elastomeric sealed relationship is produced between the fitting surfaces 26 and 32, as well as a metal-to-metal seal. The preferred slightly greater thickness of the elastomer 58 causes the compression of the elastomer prior to compression of the seal cone portion 50, and slight extrusion of the elastomer may occur which readily takes place inwardly in that the elastomer ring 58 is unconfined in this direction.

Upon fully tightening the nut 14, the seal 42, due to its relatively thin configuration will conform itself to any irregularities in the surfaces 26 and 32, such as scratches or dents, producing an effective seal. Thus, high pressure sealing is produced, and the dependability of the seal is improved over those arrangements wherein an elastomeric seal is not used with a "flare" fitting. The presence of the elastomer 58 intermediate the conical surfaces will maintain the integrity of the fitting and prevent leakage even if the metal sealing fails. The seal 58 prevents the pressurized medium from engaging the threads, and it will be appreciated that the simplicity of the invention substantially improves the efficiency and dependability of this type of fitting.

It is appreciated that various modifications to the inventive concepts may be apparent to those skilled in the art without departing from the spirit and scope of the invention.

We claim:

1. An adapter seal for use with conduit fittings having a first part having a conical nose of given axial dimension, a second part having a recessed conical surface in axial alignment with the nose and complementary thereto, and connection means axially displacing the nose and conical surface toward each other, in combination, an annular metal seal having a substantially cylindrical circumferential portion, a cone portion depending from said circumferential portion having an axial dimension slightly less than the first part nose axial dimension and having inner and outer parallel sides defining the cone portion radial thickness and terminating in an inner end, and an annular elastomer seal of conical form bonded to said cone portion inner end constituting an extension of said seal cone portion and the conical configuration thereof whereby compression of said cone portion and elastomer seal between the fitting nose and conical surface establishes both a metal-to-metal seal and an elastomer seal.

2. In an adapter seal as in claim 1, said elastomer seal having inner and outer sides defining its radial thickness, the radial thickness of said elastomer seal being slightly greater than the radial thickness of said cone portion.

* * * * *